(12) United States Patent
Kim

(10) Patent No.: US 11,872,933 B1
(45) Date of Patent: Jan. 16, 2024

(54) LIGHTING DEVICE FOR VEHICLE

(71) Applicant: HYUNDAI MOBIS Co., Ltd., Seoul (KR)

(72) Inventor: Won Sik Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/088,978

(22) Filed: Dec. 27, 2022

(30) Foreign Application Priority Data

Oct. 27, 2022 (KR) .................. 10-2022-0140251

(51) Int. Cl.
| | |
|---|---|
| *B60Q 3/60* | (2017.01) |
| *F21V 14/08* | (2006.01) |
| *F21V 23/04* | (2006.01) |
| *F21V 3/04* | (2018.01) |
| *H02J 50/00* | (2016.01) |
| *G09F 13/34* | (2006.01) |
| *G09F 11/02* | (2006.01) |

(Continued)

(52) U.S. Cl.
CPC .............. *B60Q 3/60* (2017.02); *F21V 3/049* (2013.01); *F21V 14/08* (2013.01); *F21V 23/0485* (2013.01); *B60Q 3/62* (2017.02); *B60Q 3/64* (2017.02); *F21V 2200/00* (2015.01); *G09F 11/02* (2013.01); *G09F 11/23* (2013.01); *G09F 13/32* (2013.01); *G09F 13/34* (2013.01); *G09F 13/36* (2013.01); *G09F 2011/0027* (2013.01); *H02J 50/00* (2016.02); *H02J 50/005* (2020.01)

(58) Field of Classification Search
CPC .... B60Q 3/60; B60Q 3/62; B60Q 3/64; H02J 50/00; H02J 50/005; H02J 7/025; G09F 15/0091; G09F 13/32; G09F 13/34; G09F 13/36; G09F 11/02; G09F 11/23; G09F 2011/0027
See application file for complete search history.

(56) References Cited

U.S. PATENT DOCUMENTS

| | | | | |
|---|---|---|---|---|
| 1,486,248 A | * | 3/1924 | Joseph ..................... | B60Q 1/34 116/43 |
| 1,521,931 A | * | 1/1925 | Curnutt .................... | B60Q 1/34 116/43 |

(Continued)

FOREIGN PATENT DOCUMENTS

| | | |
|---|---|---|
| DE | 102019129001 A1 | 4/2021 |
| FR | 3079179 A1 | 9/2019 |

(Continued)

OTHER PUBLICATIONS

Machine translation of KR 20210043817 A retrieved from the FIT database of PE2E search. (Year: 2023).*

(Continued)

*Primary Examiner* — Colin J Cattanach
(74) *Attorney, Agent, or Firm* — MORGAN, LEWIS & BOCKIUS LLP

(57) ABSTRACT

The lighting device for a vehicle includes a masking cover disposed inside a garnish, and a light source disposed inside the masking cover and disposed to face an inner surface of the garnish, wherein the masking cover includes a plurality of variable pattern portions provided to have different shapes and selectively disposed in a position where at least one of the plurality of variable pattern portions faces the garnish when the masking cover is rotated.

13 Claims, 9 Drawing Sheets

(51) Int. Cl.
*G09F 11/23* (2006.01)
*B60Q 3/62* (2017.01)
*G09F 13/32* (2006.01)
*B60Q 3/64* (2017.01)
*G09F 13/36* (2006.01)
*G09F 11/00* (2006.01)

(56) References Cited

U.S. PATENT DOCUMENTS

| | | | | |
|---|---|---|---|---|
| 1,752,122 A | * | 3/1930 | Thieler | B60Q 1/444 |
| | | | | 340/486 |
| 2,138,976 A | * | 12/1938 | Mason | B60Q 1/36 |
| | | | | 340/486 |
| 2013/0033463 A1 | | 2/2013 | Geyl | |
| 2021/0124104 A1 | | 4/2021 | Pastushenko | |

FOREIGN PATENT DOCUMENTS

| | | | | |
|---|---|---|---|---|
| KR | 20210043817 A | * | 4/2021 | ............ H02J 50/005 |
| WO | 96/37874 A1 | | 11/1996 | |

OTHER PUBLICATIONS

Search Report dated Oct. 2, 2023 for counterpart European Patent Application No. 22214647.4.

* cited by examiner

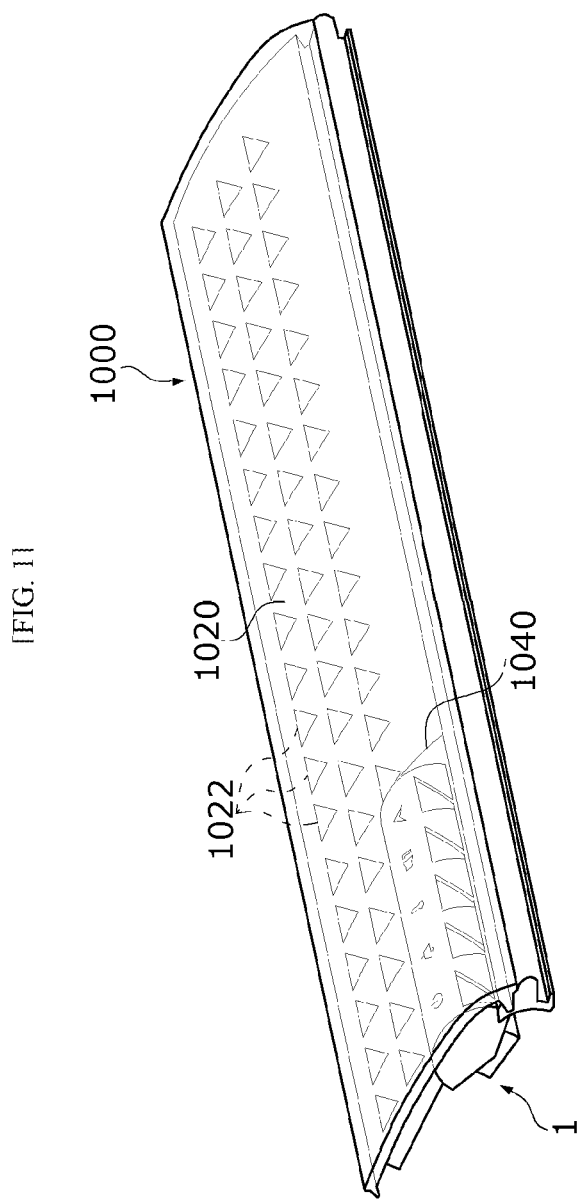
[FIG. 1]

[FIG. 2]
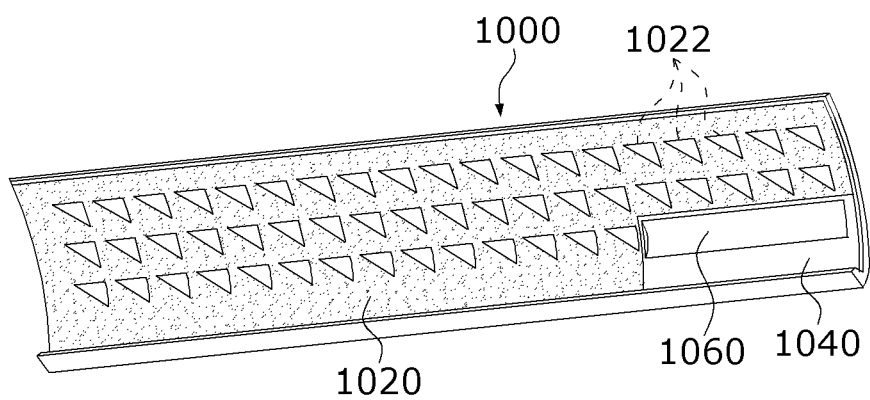

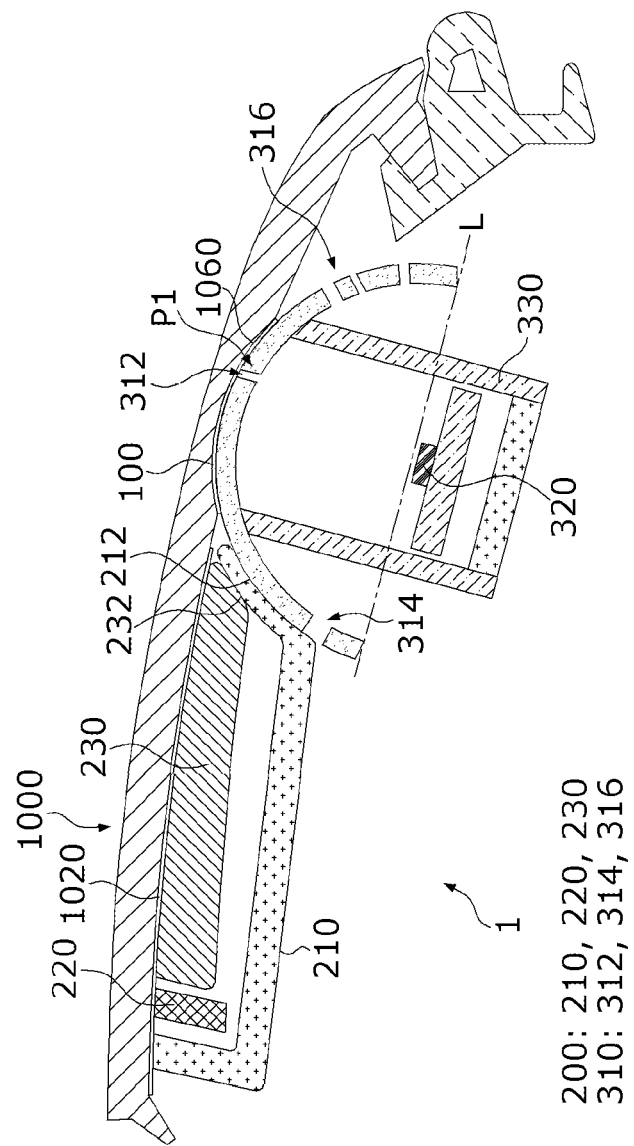
[FIG. 3]

[FIG. 4]
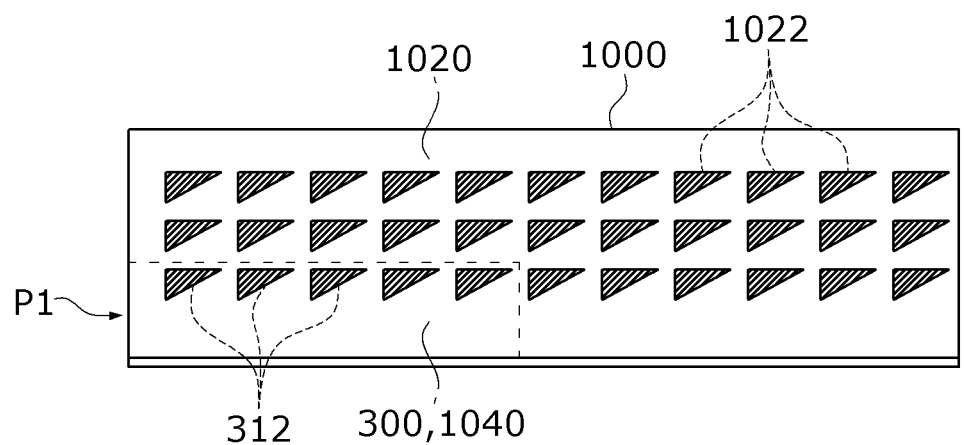

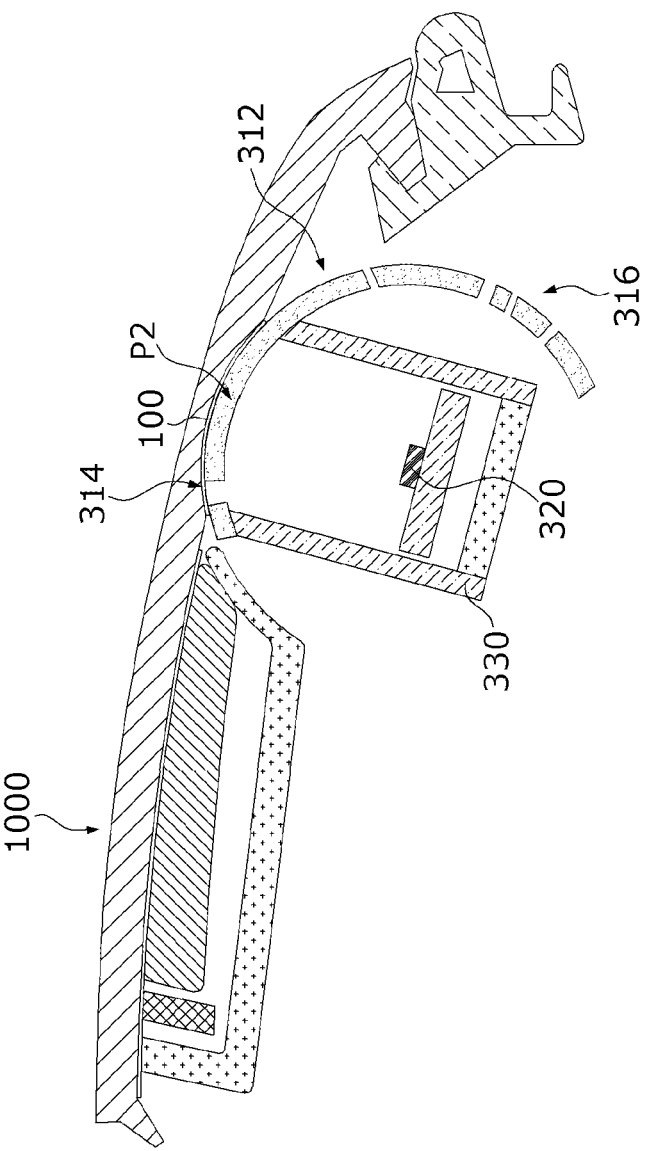
[FIG. 5]

[FIG. 6]
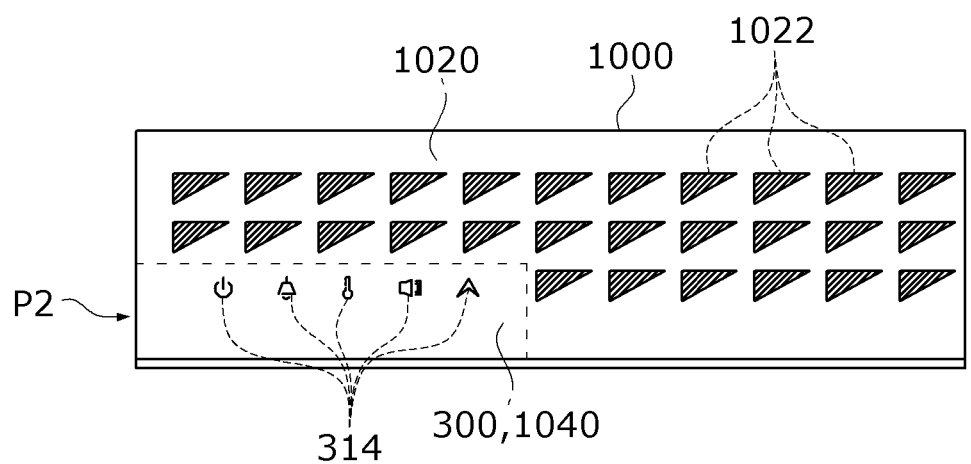

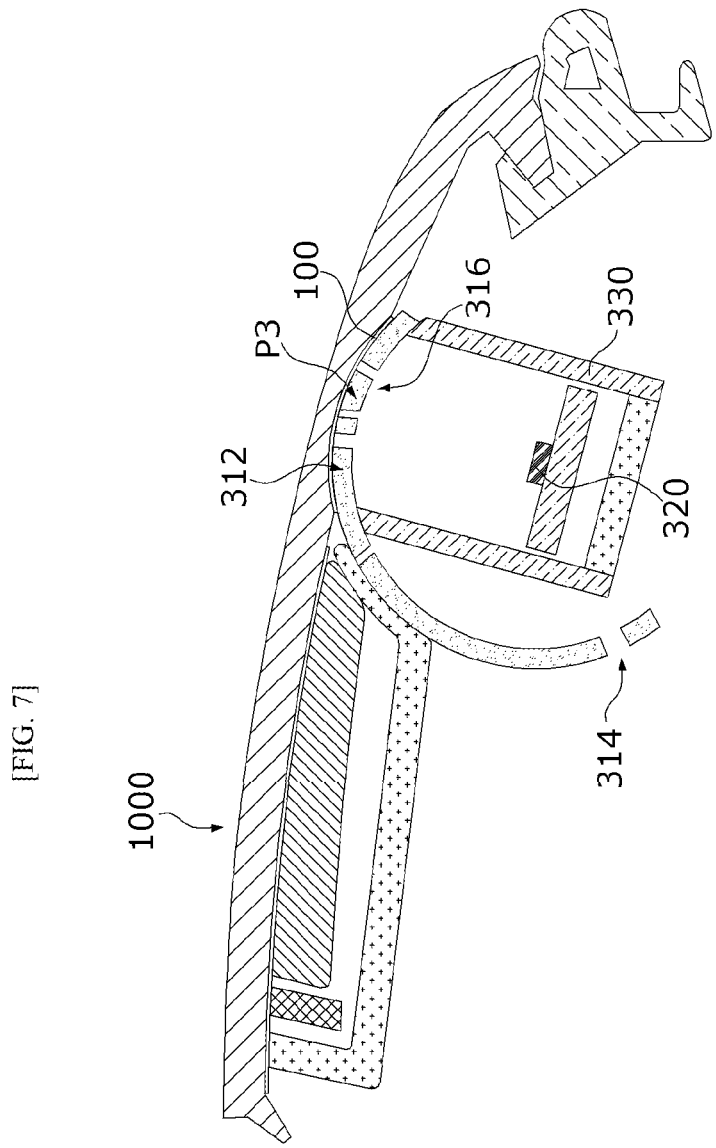

[FIG. 8]
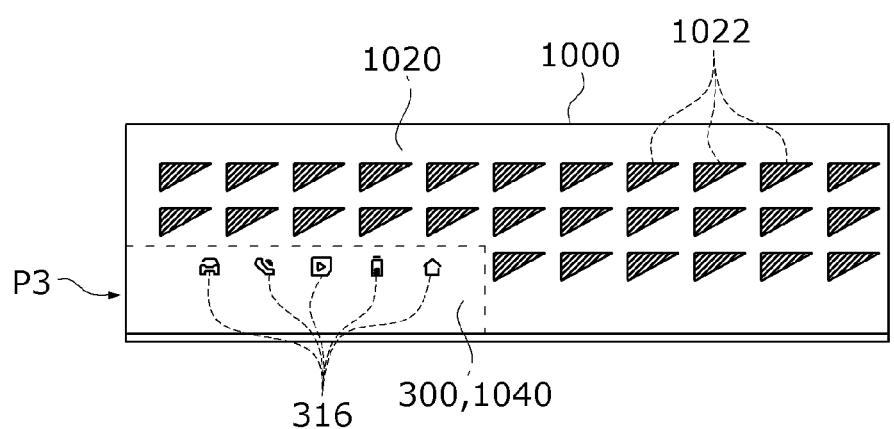

[FIG. 9]
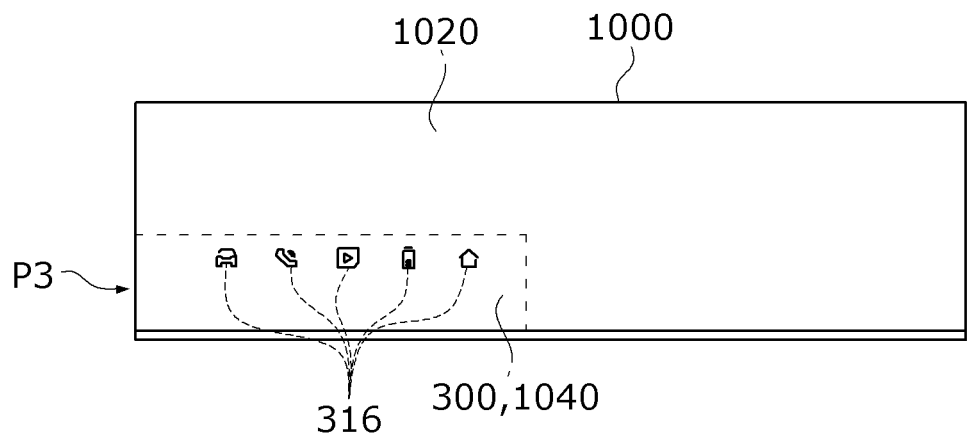

LIGHTING DEVICE FOR VEHICLE

CROSS-REFERENCE TO RELATED APPLICATION

This application claims priority to and the benefit of Korean Patent Application No. 10-2022-0140251, filed on Oct. 27, 2022, the disclosure of which is incorporated herein by reference in its entirety.

BACKGROUND

1. Field of the Invention

The present invention relates to a lighting device for a vehicle.

2. Discussion of Related Art

In general, a plurality of lighting devices are installed inside a vehicle to illuminate an interior of the vehicle. Recently, as the demand for seamless design increases, there are provided lighting devices capable of illuminating a garnish to touch desired symbols so that a program (e.g., music, video, call, temperature, or battery level) desired by a user is operated or displayed.

The lighting devices are operated in a method of not illuminating the symbols when not used and illuminating the symbols so that the symbols are displayed on the garnish when used by the user.

However, recent vehicles are equipped with many programs for implementing many functions, but since there is no method of implementing many symbols in a limited area in order not to impair the aesthetic feature of the garnish, there is a problem in that the user's convenience is impaired.

SUMMARY OF THE INVENTION

One embodiment of the present invention is directed to providing a lighting device for a vehicle that is improved to selectively illuminate many symbols in one area of a garnish.

A lighting device for a vehicle according to one embodiment of the present invention includes a masking cover disposed inside a garnish, and a light source disposed inside the masking cover and disposed to face an inner surface of the garnish, wherein the masking cover includes a plurality of variable pattern portions provided to have different shapes and selectively disposed in a position where at least one of the plurality of variable pattern portions faces the garnish when the masking cover is rotated.

The masking cover may transmit light generated from the light source in a state in which the masking cover is disposed in at least one of a first position where a virtual line connecting one end and the other end is parallel to the light source, a second position where the one end is disposed in a position facing the garnish, and a third position where the other end is disposed in a position facing the garnish.

The lighting device may include a support housing disposed inside the masking cover and surrounding the light source.

The lighting device may include a touch sensor disposed inside the garnish and disposed between the garnish and the masking cover to detect a pressure applied to the garnish.

The lighting device may further include a fixed lighting unit disposed inside the garnish and disposed on one side of the masking cover, wherein the fixed lighting unit may include a light guide having an edge shape corresponding to an edge shape of a painted area having a fixed pattern portion formed so that a plurality of shapes are disposed to be spaced apart from each other on an inner surface of the garnish.

The plurality of variable pattern portions may include a first variable pattern portion having the same shape as a shape of the fixed pattern portion, a second variable pattern portion having a shape different from that of the first variable pattern portion, and a third variable pattern portion having a shape different from those of the first variable pattern portion and the second variable pattern portion, and the second variable pattern portion and the third variable pattern portion may be disposed to be spaced apart from each other with the first variable pattern portion interposed therebetween.

The first variable pattern portion may be disposed to face the touch sensor when the masking cover is disposed in the first position, the second variable pattern portion may be disposed to face the touch sensor when the masking cover is disposed in the second position, and the third variable pattern portion may be disposed to face the touch sensor when the masking cover is disposed in the third position.

The masking cover may be rotated between the second position and the third position.

The lighting device may further include a motor connected to the masking cover and configured to generate power to rotate the masking cover.

The lighting device may further include a gear coupled to an outer surface of the masking cover, wherein the outer surface of the masking cover may have an uneven shape engaged with the gear.

In addition, a lighting device for a vehicle according to one embodiment of the present invention includes a fixed lighting unit including a fixed pattern portion formed in a painted area of a garnish, a masking cover disposed in an unpainted area of the garnish, and a light source disposed inside the masking cover and disposed to face an inner surface of the garnish, wherein the masking cover includes a plurality of variable pattern portions provided to have different shapes and selectively disposed in a position where at least one of the plurality of variable pattern portions faces the garnish when the masking cover is rotated.

The fixed lighting unit may include a guide housing disposed in the painted area of the garnish and including a first corresponding surface having a curved shape corresponding to a shape of an outer surface of the masking cover.

The fixed lighting unit may include a light guide disposed inside the guide housing and including a second corresponding surface having a shape corresponding to the first corresponding surface of the guide housing.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a perspective view of a state in which a garnish is transparently shown in a lighting device for a vehicle according to one embodiment of the present invention;

FIG. 2 is a view showing an inner surface of the garnish;

FIG. 3 is a cross-sectional view along line A-A in FIG. 1;

FIG. 4 is a view showing a state in which a pattern of a first variable pattern portion is illuminated on the garnish;

FIG. 5 is a view showing a state in which a masking cover is disposed in a second position;

FIG. 6 is a view showing a state in which a pattern of a second variable pattern portion is illuminated on the garnish;

FIG. 7 is a view showing a state in which the masking cover is disposed in a third position;

FIG. 8 is a view showing a state in which a pattern of a third variable pattern portion is illuminated on the garnish; and FIG. 9 is a view showing a state in which only the pattern of the third variable pattern portion is illuminated on the garnish.

DETAILED DESCRIPTION OF EXEMPLARY EMBODIMENTS

Since the present invention may have various changes and various embodiments, specific embodiments are shown and described in the accompanying drawings. However, it should be understood that this is not intended to limit the present invention to the specific embodiments and includes all modifications, equivalents, and substitutes included in the spirit and scope of the present invention.

Terms including ordinal numbers such as first and second may be used to describe various components, but the components are not limited by the terms. The terms are used only for the purpose of distinguishing one component from another. For example, a second component may be referred to as a first component, and similarly, the first component may also be referred to as the second component without departing from the scope of the present invention. A term "and/or" includes a combination of a plurality of related listed items or any one of the plurality of related listed items.

It should be understood that when a certain component is described as being "connected" or "jointed" to another component, the certain component may be directly connected or joined to another component, but other components may also be present therebetween. On the other hand, it should be understood that when a certain component is described as being "directly connected" or "directly jointed" to another component, other components are not present therebetween.

In the description of the embodiments, when any one component is described as being formed on "top (above) or bottom (below)" of another component, the top (above) or bottom (below) includes not only a case in which two components come into direct contact with each other but also a case in which one or more other components are (indirectly) disposed and formed between the two components. In addition, when expressed as "top (above) or bottom (below)," this may also include the meaning of not only an upward direction but also a downward direction with respect to one component.

The terms used in the application are only used to describe specific embodiments, and are not intended to limit the present invention. The singular expression includes the plural expression unless the context clearly dictates otherwise. In the application, it should be understood that terms such as "comprise" or "have" are intended to designate that a feature, number, step, operation, component, part, or combination thereof described in the specification is present and do not preclude the possibility of the presence or addition of one or more other features, numbers, steps, operations, components, parts, or combinations thereof in advance.

Unless defined otherwise, all terms used herein, including technical or scientific terms, have the same meaning as commonly understood by those skilled in the art to which the present invention pertains. Terms such as those defined in a commonly used dictionary should be interpreted as having a meaning consistent with the meaning in the context of the related art and should not be interpreted in an ideal or excessively formal meaning unless explicitly defined in the application.

Hereinafter, a rotational lighting device and a lighting device for a vehicle including the same will be described in detail with reference to the accompanying drawings, and the same or corresponding components regardless of the reference numerals are given the same reference numbers, and overlapping descriptions thereof will be omitted.

FIG. 1 is a perspective view of a state in which a garnish is transparently shown in a lighting device for a vehicle according to one embodiment of the present invention, FIG. 2 is a view showing an inner surface of the garnish, and FIG. 3 is a cross-sectional view along line A-A in FIG. 1.

Referring to FIGS. 1 to 3, a lighting device 1 for a vehicle according to one embodiment of the present invention includes a touch sensor 100 disposed between a garnish 1000 and a masking cover 300, a fixed lighting unit 200 including a fixed pattern portion 1022 formed in a painted area 1020 of the garnish 1000, the masking cover 300 disposed in an unpainted area 1040 of the garnish 1000, and a light source 320 disposed inside the masking cover 300 and disposed to face an inner surface of the garnish 1000.

First, the garnish 1000 described in the embodiment is an ornament installed in a vehicle and may be installed in various places inside and outside a vehicle. The garnish 1000 described in the embodiment refers to the garnish 1000 installed inside a vehicle and made of a material which may transmit light.

As shown in FIGS. 1 and 2, the garnish 1000 may include an outer surface exposed to be seen by a vehicle occupant and an inner surface engraved with a shape through a painting operation. In particular, the inner surface of the garnish 1000 may include the painted area 1020 in which shapes engraved through the painting operation are uniformly arranged to form a pattern and the unpainted area 1040 not painted. The painted area 1020 may be formed to have the fixed pattern portion 1022 in which the shapes formed through the painting operation are disposed to be spaced a regular interval from each other in a longitudinal direction or a width direction of the garnish 1000.

In addition, a groove 1060 may be formed in the unpainted area 1040 of the inner surface of the garnish 1000. The groove 1060 may be formed in a direction from the inner surface of the garnish 1000 toward an outer surface thereof. The groove 1060 may have a curved shape corresponding to an outer surface of the masking cover 300. Therefore, the groove 1060 may provide a space in which a portion of the masking cover 300 may be rotated.

FIG. 4 is a view showing a state in which a pattern of a first variable pattern portion is illuminated on the garnish, FIG. 5 is a view showing a state in which a masking cover is disposed in a second position, FIG. 6 is a view showing a state in which a pattern of a second variable pattern portion is illuminated on the garnish, FIG. 7 is a view showing a state in which the masking cover is disposed in a third position, FIG. 8 is a view showing a state in which a pattern of a third variable pattern portion is illuminated on the garnish, and FIG. 9 is a view showing a state in which only the pattern of the third variable pattern portion is illuminated on the garnish.

Referring to FIGS. 3 to 9, the touch sensor 100 may be disposed in the unpainted area 1040 of the garnish 1000. More specifically, the touch sensor 100 may be disposed in the groove 1060 formed in the inner surface of the garnish

1000. The touch sensor 100 may come into contact with the masking cover 300 in a state of being in contact with the groove 1060. In other words, the touch sensor 100 may be disposed between the garnish 1000 and the masking cover 300. The touch sensor 100 may be provided in the form of a film having flexibility. Therefore, the touch sensor 100 may be deformed according to a shape of the groove 1060 or a shape of the outer surface of the masking cover 300. In addition, the touch sensor 100 may be made of a transparent material which may transmit light emitted from a light source.

The touch sensor 100 may detect a pressure applied to the garnish 1000. More specifically, when a user touches an outer surface area of the garnish 1000 corresponding to an area overlapping positions where shapes of a plurality of variable pattern portions 310 to be described below of the masking cover 300 are disposed, the user may detect a pressed force.

In addition, although not shown, the touch sensor 100 may be connected to a control device (not shown) disposed inside a vehicle. Therefore, when the user presses the outer surface area corresponding to the unpainted area 1040 of the garnish 1000, the touch sensor 100 may detect a pressure applied to the garnish 1000 and transmit a detected pressure value to the control device (not shown).

The fixed lighting unit 200 may be disposed inside the garnish 1000. The fixed lighting unit 200 may be coupled to the garnish 1000 to illuminate the garnish 1000.

The fixed lighting unit 200 may include a guide housing 210, a first light source 220, and a light guide 230.

The guide housing 210 may be disposed inside the garnish 1000. More specifically, the guide housing 210 may be disposed in the painted area 1020 formed on the inner surface of the garnish 1000. The guide housing 210 may have an edge shape corresponding to an edge shape of the painted area 1020 formed on the inner surface of the garnish 1000. Therefore, the guide housing 210 may have a shape which does not cover the unpainted area 1040 of the inner surface of the garnish 1000. The guide housing 210 may be provided in a hollow shape to accommodate the first light source 220 and the light guide 230 therein.

The guide housing 210 may include a first corresponding surface 212. The first corresponding surface 212 may be an outer surface or an inner surface of the guide housing 210 having a curved shape corresponding to a shape of the outer surface of the masking cover 300 to be described below.

In addition, the first corresponding surface 212 may also be disposed to be spaced a predetermined interval from the masking cover 300. Therefore, since the first corresponding surface 212 does not interfere with a rotational motion of the masking cover 300, damage to the guide housing 210 and the masking cover 300 can be prevented.

The first light source 220 may be disposed inside the guide housing 210. The first light source 220 may include a light emitting diode (LED) and further include a board coupled to the LED to transmit a signal to the LED. The first light source 220 may be disposed in the width direction of the garnish 1000 crossing the longitudinal direction of the garnish 1000. Light generated from the first light source 220 may be directed to the light guide 230 in the width direction of the garnish 1000. In the embodiment, the longitudinal direction may refer to a direction from an occupant room of a vehicle toward an engine room or a direction from the engine room of a vehicle toward the occupant room, and the width direction may refer to a width direction of a vehicle or a direction from a driver's seat of a vehicle to an occupant's seat of a vehicle.

The light guide 230 may be disposed inside the guide housing 210. The light guide 230 may be disposed in front of the first light source 220 inside the guide housing 210 in the width direction. One surface (e.g., upper surface) of the light guide may be provided in a shape corresponding to a shape of the inner surface of the garnish 1000 and may have an edge shape corresponding to the edge shape of the painted area 1020 having the fixed pattern portion 1022 formed on the inner surface of the garnish 1000. The light guide 230 may be made of a transparent material which may transmit light generated from the first light source 220. The light guide 230 may guide the light so that the light generated from the first light source 220 may be evenly spread in the painted area 1020 of the garnish 1000.

The light guide 230 may include a second corresponding surface 232. The second corresponding surface 232 may have a shape corresponding to the first corresponding surface 212 of the guide housing 210. Therefore, the light guide 230 may be supported in contact with the guide housing 210. Therefore, it is possible to secure the stability of the light guide 230.

The masking cover 300 may be disposed inside the garnish 1000. The masking cover 300 may be provided in a hollow shape to accommodate the light source and a support housing 330 therein.

A portion of the masking cover 300 may be in contact with the touch sensor 100. In addition, the portion of the masking cover 300 may be rotatably disposed in the groove 1060 formed in the inner surface of the garnish 1000. Therefore, the masking cover 300 in a stationary state may function to support the touch sensor 100, and the masking cover 300 in a rotational state may maintain the role of supporting the touch sensor 100 as in the stationary state. Therefore, the masking cover 300 can improve the stability of the touch sensor 100.

The masking cover 300 may include a plurality of variable pattern portions 310. The plurality of variable pattern portions 310 may be provided to have different shapes, and when the masking cover 300 is rotated, at least one variable pattern portion may be selectively disposed in a position facing the garnish 1000.

The plurality of variable pattern portions 310 may include a first variable pattern portion 312, a second variable pattern portion 314, and a third variable pattern portion 316. Each shape of the plurality of variable pattern portions 310 may be formed by a combination of holes formed to pass through the inner surface of the masking cover 300 from the outer surface thereof.

The first variable pattern portion 312 may have the same shape as that of the fixed pattern portion 1022 formed in the painted area 1020 of the garnish 1000. The first variable pattern portion 312 may be formed in a central area of the masking cover 300. The shapes of the first variable pattern portions 312 may be disposed to be spaced apart from each other in the longitudinal direction of the masking cover 300. In this case, a separated interval may be the same as an interval at which the shapes of the fixed pattern portions 1022 formed in the painted area 1020 of the garnish 1000 are disposed to be spaced apart from each other.

The second variable pattern portion 314 may have a shape different from that of the first variable pattern portion 312. The second variable pattern portion 314 may be formed at one end of the masking cover 300. More specifically, the second variable pattern portion 314 may be formed at an end of the masking cover 300 adjacent to the fixed lighting unit 200. The second variable pattern portion 314 may refer to a group in which a plurality of different shapes are disposed to be spaced a regular interval from each other. The respective shapes of the second variable pattern portions 314 may be provided in different shapes.

The third variable pattern portion 316 may have a shape different from those of the first variable pattern portion 312 and the second variable pattern portion 314. The third variable pattern portion 316 may be formed at the other end of the masking cover 300. More specifically, the third variable pattern portion 316 may be formed at an end of the masking cover 300 adjacent to the fixed lighting unit 200. Therefore, the third variable pattern portions 316 may be disposed to be spaced apart from each other with the first variable pattern portions 312 interposed therebetween. The third variable pattern portion 316 may refer to a group in which a plurality of different shapes are disposed to be spaced a regular interval from each other. The respective shapes of the third variable pattern portions 316 may be provided to be different. The third variable pattern portion 316 may have a shape different from each shape of the second variable pattern portions 314.

The light source is the second light source 320, and the second light source 320 may be the same LED as the first light source 220. The second light source 320 may be disposed in a direction from the inner surface of the garnish 1000 toward the outer surface thereof. The second light source 320 may be supported by the support housing 330. The second light source 320 may be disposed to face the groove 1060 formed in the garnish 1000. Therefore, the light generated from the second light source 320 may be directed to the masking cover 300 or refracted through an inner surface of the support housing 330 and directed to the masking cover 300. Therefore, when the light generated from the second light source 320 passes through any one of the first variable pattern portion 312 to the third variable pattern portion 316 of the masking cover 300, the light may pass through the touch sensor 100 and illuminate the garnish 1000.

The support housing 330 may be disposed inside the masking cover 300 and may surround the second light source 320. A surface of the support housing 330 in contact with the masking cover 300 may have a curved shape corresponding to the shape of the inner surface of the masking cover 300. Therefore, the support housing 330 may rotatably support the masking cover 300. The support housing 330 may include a first frame for covering a side of the second light source 320 and a second frame for supporting the second light source 320 while covering an open side of the first frame, but the present invention is not limited thereto. The support housing 330 may also be provided integrally with the first frame and the second frame combined.

Hereinafter, a state in which the masking cover 300 is disposed in a first position P1, a second position P2, and a third position P3 will be described.

Referring to FIGS. 3 and 4, the masking cover 300 may be disposed in the first position P1 where a virtual line L connecting one end and the other end is disposed parallel to the second light source 320. When the masking cover 300 is disposed in the first position P1, the first variable pattern portion 312 may be disposed to face the touch sensor 100. In other words, the second light source 320, the first variable pattern portion 312, the touch sensor 100, and the unpainted area 1040 of the garnish 1000 are positioned to be collinear. Therefore, the light generated from the second light source 320 may pass through the first variable pattern portion 312 and the touch sensor 100 and may illuminate the garnish 1000 in the same shape as the shape of the first variable pattern portion 312. Therefore, the garnish 1000 may be illuminated with light having the same shape of the first variable pattern portion 312 as that of the fixed pattern portion 1022 formed in the painted area 1020.

Referring to FIGS. 5 and 6, the masking cover 300 may be disposed in the second position P2 having one end disposed in a position facing the garnish 1000. When the masking cover 300 is disposed in the second position P2, the second variable pattern portion 314 may be disposed to face the touch sensor 100. In other words, the second light source 320, the second variable pattern portion 314, the touch sensor 100, and the unpainted area 1040 of the garnish 1000 are positioned to be collinear. Therefore, the light generated from the second light source 320 may pass through the second variable pattern portion 314 and the touch sensor 100 and may illuminate the garnish 1000 in the same shape as the shape of the second variable pattern portion 314. Since the shapes of the second variable pattern portions 314 are different from those of the first variable pattern portions 312, the garnish 1000 may be illuminated with light having a shape of the second variable pattern portion 314 different from the shape of the fixed pattern portion 1022 formed in the painted area 1020.

Referring to FIGS. 7 and 8, the masking cover 300 may be disposed in the third position P3 where the other end is disposed in the position facing the garnish 1000. When the masking cover 300 is disposed in the third position P3, the third variable pattern portion 316 may be disposed to face the touch sensor 100. In other words, the second light source 320, the third variable pattern portion 316, the touch sensor 100, and the unpainted area 1040 of the garnish 1000 are positioned to be collinear. Therefore, the light generated from the second light source 320 may pass through the third variable pattern portion 316 and the touch sensor 100 and may illuminate the garnish 1000 in the same shape as the shape of the third variable pattern portion 316. Since the shapes of the third variable pattern portions 316 have shapes different from those of the first variable pattern portions 312, the garnish 1000 may be illuminated with light having a shape of the third variable pattern portion 316 different from the shape of the fixed pattern portion 1022 formed in the painted area 1020.

In addition, referring to FIG. 9, the lighting device 1 for a vehicle may be configured so that light is not generated from the first light source 220 and the light is generated from only the second light source 320 in a state in which the masking cover 300 is disposed in the third position P3. Therefore, as shown in FIG. 9, only the light having the shape of the third variable pattern portion 316 may illuminate the garnish 1000. In the embodiment, FIG. 9 shows an example in which the light having the shape of the third variable pattern portion 316 illuminates the garnish 1000, but the present invention is not limited thereto. The garnish 1000 may be illuminated with only the light having the shape of the first variable pattern portion 312 in a state in which the masking cover 300 is disposed in the first position P1, and the garnish 1000 may be illuminated with only the light having the shape of the second variable pattern portion 314 in a state in which the masking cover 300 is disposed in the second position P2.

In the lighting device 1 for a vehicle according to one embodiment of the present invention, many programs may be selected by even the small motion of the user because many shapes are illuminated in one area of the garnish 1000 by the rotation of the masking cover 300. Therefore, it is possible to improve the user's convenience.

Although not shown, the lighting device 1 for a vehicle according to one embodiment of the present invention may further include a motor and a rotation detection sensor. The motor may be connected to the masking cover 300. The motor may generate power according to a control signal of the control device (not shown) disposed inside a vehicle. When the motor generates power, the masking cover 300 may be rotated clockwise or counterclockwise. Therefore, the masking cover 300 may be disposed in any one of the first position P1, the second position P2, and the third position P3. The rotation detection sensor may be connected to a rotational shaft of the motor or the masking cover 300 to measure a rotational direction or rotational speed of the rotational shaft of the motor or the masking cover 300 and may transmit the rotational direction or rotational speed of the rotational shaft of the motor or the masking cover 300 to the control device (not shown).

Although not shown, the lighting device 1 for a vehicle may further include a gear. The gear may be coupled to the outer surface of the masking cover 300. Therefore, the outer surface of the masking cover 300 may have an uneven shape engaged with the gear. When the gear and the outer surface of the masking cover 300 are engaged with each other, the masking cover 300 may be rotated by the motion of the gear. In addition, the lighting device 1 for a vehicle may further include a lever for rotating the gear. The lever may be connected to the gear to be operated by a user. Therefore, when the gear is moved by the rotation of the lever, the masking cover 300 may be rotated.

According to one embodiment of the present invention, since many symbols can be selectively illuminated in one area of a garnish to select many programs even with the small motion of a user, it is possible to improve the user's convenience.

Although the present invention has been described above with reference to embodiments of the present invention, those skilled in the art will be able to understand that the present invention may be variously modified and changed without departing from the spirit and scope of the present invention described in the appended claims. In addition, differences related to the modifications and changes should be construed as being included in the scope of the present invention defined in the appended claims.

What is claimed is:

1. A lighting device for a vehicle, comprising:
   a masking cover disposed inside a garnish;
   a light source disposed inside the masking cover and disposed to face an inner surface of the garnish; and
   a touch sensor disposed inside the garnish and disposed between the garnish and the masking cover to detect a pressure applied to the garnish,
   wherein the masking cover includes a plurality of variable pattern portions provided to have different shapes and selectively disposed in a position where at least one of the plurality of variable pattern portions faces the garnish when the masking cover is rotated.

2. The lighting device of claim 1, wherein the masking cover transmits light generated from the light source in a state in which the masking cover is disposed in one of a first position where a virtual line connecting one end and the other end is parallel to the light source, a second position where the one end is disposed in a position facing the garnish, and a third position where the other end is disposed in a position facing the garnish.

3. The lighting device of claim 1, further comprising: a support housing disposed inside the masking cover and surrounding the light source.

4. The lighting device of claim 2, further comprising: a fixed lighting unit disposed inside the garnish and disposed on one side of the masking cover,
   wherein the fixed lighting unit includes a light guide having an edge shape corresponding to an edge shape of a painted area having a fixed pattern portion formed on the inner surface of the garnish so that a plurality of shapes are disposed to be spaced apart from each other on the inner surface of the garnish.

5. The lighting device of claim 4, wherein the plurality of variable pattern portions include:
   a first variable pattern portion having the same shape as a shape of the fixed pattern portion;
   a second variable pattern portion having a shape different from that of the first variable pattern portion; and
   a third variable pattern portion having a shape different from those of the first variable pattern portion and the second variable pattern portion, and
   the second variable pattern portion and the third variable pattern portion are disposed to be spaced apart from each other with the first variable pattern portion interposed therebetween.

6. The lighting device of claim 5, wherein the first variable pattern portion is disposed to face the touch sensor when the masking cover is disposed in the first position, the second variable pattern portion is disposed to face the touch sensor when the masking cover is disposed in the second position, and the third variable pattern portion is disposed to face the touch sensor when the masking cover is disposed in the third position.

7. The lighting device of claim 6, wherein the masking cover is rotated between the second position and the third position.

8. The lighting device of claim 1, further comprising: a motor connected to the masking cover and configured to generate power to rotate the masking cover.

9. The lighting device of claim 1, further comprising: a gear coupled to an outer surface of the masking cover,
   wherein the outer surface of the masking cover has an uneven shape engaged with the gear.

10. A lighting device for a vehicle, comprising:
    a fixed lighting unit including a fixed pattern portion formed in a painted area of a garnish;
    a masking cover disposed in an unpainted area of the garnish;
    a light source disposed inside the masking cover and disposed to face an inner surface of the garnish; and
    a touch sensor disposed inside the garnish and disposed between the garnish and the masking cover to detect a pressure applied to the garnish,
    wherein the masking cover includes a plurality of variable pattern portions provided to have different shapes and selectively disposed in a position where at least one of the plurality of variable pattern portions faces the garnish when the masking cover is rotated.

11. The lighting device of claim 10, wherein the fixed lighting unit includes a guide housing disposed in the painted area of the garnish and including a first corresponding surface having a curved shape corresponding to a shape of an outer surface of the masking cover.

12. The lighting device of claim 11, wherein the fixed lighting unit includes a light guide disposed inside the guide housing and including a second corresponding surface having a shape corresponding to the first corresponding surface of the guide housing.

13. The lighting device of claim 10, wherein the masking cover transmits light generated from the light source in a state in which the masking cover is disposed in one of a first position where a virtual line connecting one end and the other end is parallel to the light source, a second position where the one end is disposed in a position facing the garnish, and a third position where the other end is disposed in a position facing the garnish.

* * * * *